United States Patent
Emma et al.

(10) Patent No.: US 11,210,092 B2
(45) Date of Patent: Dec. 28, 2021

(54) SERVICING INDIRECT DATA STORAGE REQUESTS WITH MULTIPLE MEMORY CONTROLLERS

(71) Applicant: INTERNATIONAL BUSINESS MACHINES CORPORATION, Armonk, NY (US)

(72) Inventors: Philip G. Emma, Danbury, CT (US); Michael B. Healy, Cortlandt Manor, NY (US); Tejas Karkhanis, White Plains, NY (US); Ching-Pei Lin, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 215 days.

(21) Appl. No.: 15/912,960

(22) Filed: Mar. 6, 2018

(65) Prior Publication Data

US 2019/0278601 A1    Sep. 12, 2019

(51) Int. Cl.
*G06F 9/30* (2018.01)
*G06F 12/02* (2006.01)

(52) U.S. Cl.
CPC .......... *G06F 9/30043* (2013.01); *G06F 12/02* (2013.01)

(58) Field of Classification Search
CPC ........ G06F 9/30043; G06F 9/35; G06F 12/00; G06F 12/02
See application file for complete search history.

(56) References Cited

U.S. PATENT DOCUMENTS

| | | | |
|---|---|---|---|
| 6,052,766 A | 4/2000 | Betketr et al. | |
| 6,473,845 B1 * | 10/2002 | Hornung | G06F 12/0292 711/162 |
| 6,791,555 B1 * | 9/2004 | Radke | G06F 13/1657 345/531 |
| 7,613,881 B2 | 11/2009 | Illowsky et al. | |

(Continued)

OTHER PUBLICATIONS

Hennessy et al., "Computer Architecture—A Quantitative Approach", 2nd Edition, 1996, p. 75.*

(Continued)

*Primary Examiner* — David J. Huisman
(74) *Attorney, Agent, or Firm* — Cantor Colburn LLP; Vazken Alexanian (57) ABSTRACT

Embodiments of the invention include method, systems and computer program products for servicing indirect storage requests. Method includes decoding a storage request instruction and sending to a first one of a plurality of memory controllers an address represented by a first pointer associated with at least a portion of the storage request instruction. A first memory is used to read information associated with a second pointer contained at the address. The first memory forwards the storage request instruction to a second one of the plurality of memory controllers, wherein the second one of the plurality of memory controllers is associated with and/or manages a memory location represented by the second pointer. The second one of the plurality of memory controllers reads and forwards data associated with the storage request instruction to a processor using the second pointer. The processor writes the forwarded data in a destination register of the processor.

16 Claims, 6 Drawing Sheets

(56) References Cited

U.S. PATENT DOCUMENTS

2004/0205740 A1    10/2004  Lavery et al.
2006/0004942 A1*   1/2006  Hetherington ........ G06F 9/3867
                                                                711/3

OTHER PUBLICATIONS

X. Yu, et al. "Indirect Memory Prefetcher", Proceedings to the 48th International Symposium on Microarchitecture, Dec. 5-9, 2015, p. 1-13.

* cited by examiner

SERVICING INDIRECT DATA STORAGE REQUESTS WITH MULTIPLE MEMORY CONTROLLERS

BACKGROUND

The present invention relates in general to retrieving data from memory in a computing device or system, and more specifically, to providing an instruction within an instruction set architecture (ISA) that can fetch data from memory using a memory controller without causing cache pollution.

In computer architecture, a memory hierarchy is used to visualize and address performance issues in computer architectural design, algorithm predictions, and lower level programming. The memory hierarchy separates each hierarchy level based on response time.

An ISA is a part of the computer architecture that pertains to programming and is an interface between the hardware and software of a computer. The instruction set of an ISA provides commands to the processor indicating desired actions to be performed by the processor. The instruction set includes addressing modes, instructions, native data types, registers, memory architecture, interrupt handling, exception handling, and external input/output.

SUMMARY

Embodiments of the invention are directed to a computer-implemented method for servicing indirect storage requests. A non-limiting example of the method includes decoding, by a processor, a storage request instruction and using the processor to send to a first one of a plurality of memory controllers an address represented by a first pointer associated with at least a portion of the storage request instruction. A first memory is used to read information associated with a second pointer contained at the address associated with the portion of the storage request instruction represented by the first pointer. The first memory forwards the storage request instruction to a second one of the plurality of memory controllers, wherein the second one of the plurality of memory controllers is associated with and/or manages a memory location represented by the second pointer. The second one of the plurality of memory controllers reads and forwards data associated with the storage request instruction to a processor using the second pointer. The processor writes the forwarded data in a destination register of the processor.

Embodiments of the invention are directed to a computer program product can comprise a non-transitory storage medium readable by a processing circuit that can store instructions for execution by the processing circuit for performing a method for servicing indirect storage requests. A non-limiting example of the method includes decoding, by a processor, a storage request instruction and using the processor to send to a first one of a plurality of memory controllers an address represented by a first pointer associated with at least a portion of the storage request instruction. A first memory is used to read information associated with a second pointer contained at the address associated with the portion of the storage request instruction represented by the first pointer. The first memory forwards the storage request instruction to a second one of the plurality of memory controllers, wherein the second one of the plurality of memory controllers is associated with and/or manages a memory location represented by the second pointer. The second one of the plurality of memory controllers reads and forwards data associated with the storage request instruction to a processor using the second pointer. The processor writes the forwarded data in a destination register of the processor.

Embodiments of the invention are directed to a system for servicing indirect storage requests. A non-limiting example of the system includes a processor in communication with one or more types of memory. The processor is configured to decode a storage request instruction and send to a first one of a plurality of memory controllers an address represented by a first pointer associated with at least a portion of the storage request instruction. A first memory is used to read information associated with a second pointer contained at the address associated with the portion of the storage request instruction represented by the first pointer. The first memory forwards the storage request instruction to a second one of the plurality of memory controllers, wherein the second one of the plurality of memory controllers is associated with and/or manages a memory location represented by the second pointer. The second one of the plurality of memory controllers reads and forwards data associated with the storage request instruction to a processor using the second pointer. The processor writes the forwarded data in a destination register of the processor.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, embodiments of the invention are related in general to a memory controller and instructions used by the memory controller. A memory controller manages a variety of memory-related operations, including, for example, memory read operations, memory write operations, and keeping the random access memory (RAM) portions of the memory active by supplying the memory with electric current. In a known configuration, the memory controller can include a front end and a back end. The front end buffers requests, buffers responses, acts as an interface with system components, etc. The back end provides an interface with various system components including, for example, main memory components. Another technology relevant to aspects of the invention is a cache. A cache is a high-speed memory component used by a processor. The cache can act as a buffer between the processor and main memory.

Cache pollution describes a situation where an executing computer program loads data into CPU cache unnecessarily, thus causing other useful cache data to be evicted from the cache into lower levels of the memory hierarchy, which degrades a computer system's performance. Caches can experience cache pollution when pointers, which are used to indicate where data resides and require storage space in the cache, are included with the data when fetching the data. Because the cache has to store the pointer and data, useful space within the cache, which has a limited capacity, is occupied leading to a potential eviction of useful data from the cache. This type of cache pollution can occur when interacting with a database or any other process or structure that uses a large amount of pointers, records or links.

Turning now to an overview of the aspects of the invention, one or more embodiments of the invention address the above-described shortcomings of the prior art by providing a new kind of request (instruction) and memory system for processing the new instruction. The new system utilizes a new LOAD instruction and a memory controller configured to fetch data from memory indirectly. In some embodiments of the invention, the new system utilizes the new LOAD instruction to fetch data from memory indirectly using a first pointer that points to a second pointer indicating the location of data in memory.

The above-described aspects of the invention address the shortcomings of the prior art by utilizing a memory controller to fetch data from memory indirectly. The invention also uses an ISA that includes a new instruction that can cause the memory controller to access a memory location using a pointer that points to a second pointer that indicates the location in memory to be accessed. Allowing the memory controller to fetch data using indirect storage request, enables a processor to fetch the data required for processing without acquiring and storing pointer information along with the data. The indirect fetch can occur without the utilization of a cache. Utilizing an indirect fetch to obtain data as described herein reduces instances of cache pollution and also prevents the possession of data that is contiguous to the pointer, which would cause performance degradation in multi-core environments where multiple cores are be accessing contiguous but distinct data.

Figure 1:
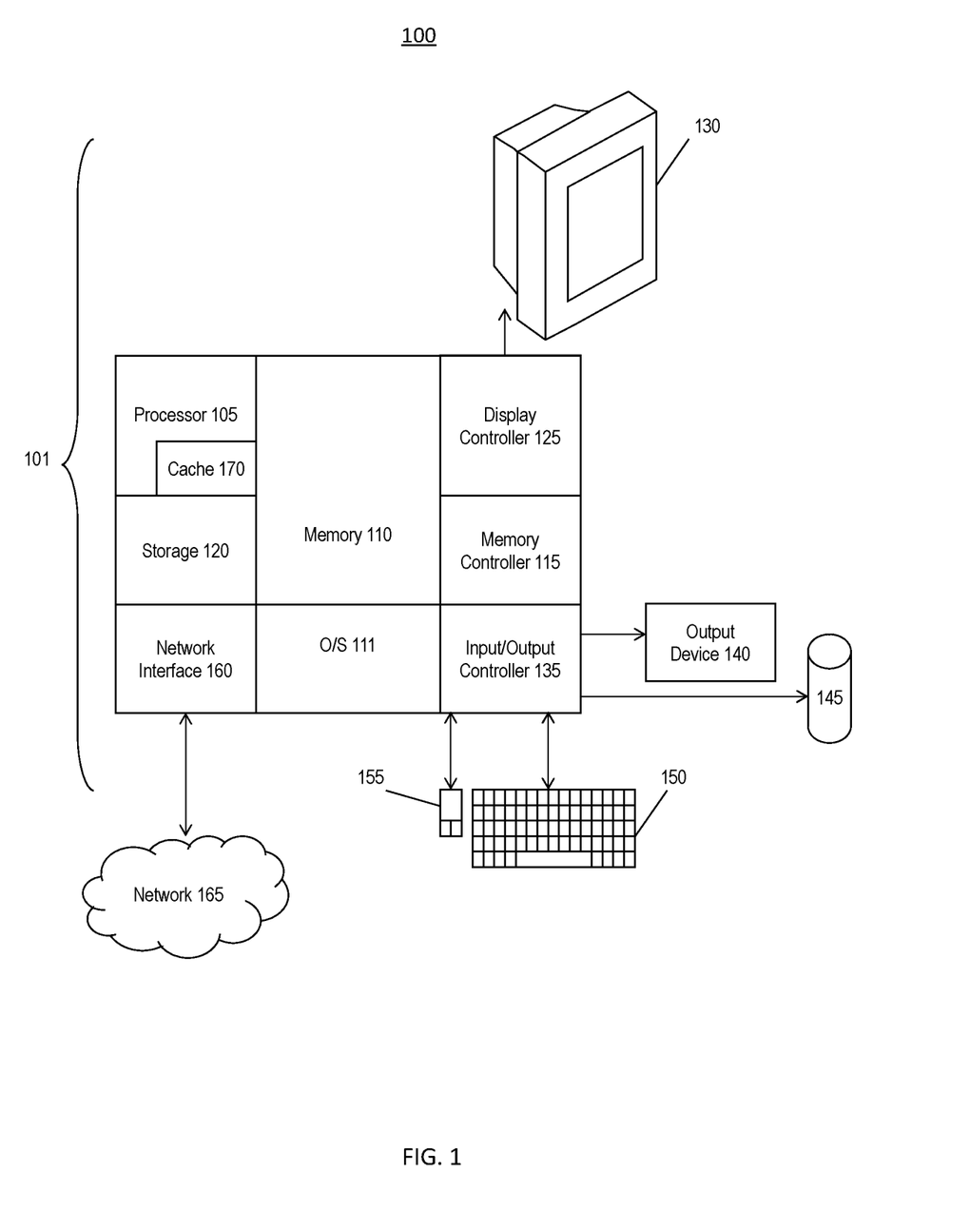
FIG. 1 is a block diagram illustrating one example of a processing system for practice of the teachings herein.

FIG. 1 is a block diagram illustrating one example of a processing system 100 for practice of the teachings described herein. In exemplary embodiments of the invention, in terms of hardware architecture, the processing system 100 includes a computer 101 having a processor 105. The computer 101 further includes memory 110 coupled to a memory controller 115, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/ output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in storage 120, cache storage 170, or memory 110. The processor 105 can also execute software stored in registers that are located inside the processor 105 (not shown). Each register typically holds a word of data (often 32 or 64 bits). The processor 105 can be any custom made or commercially available processor, a central processing unit (CPU), an auxiliary processor among several processors associated with the computer 101, a semiconductor-based microprocessor (in the form of a microchip or chip set), a macroprocessor, or generally any device for executing instructions. The processor 105 can include one or more cores.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). DRAM systems can include, for example, dual in-line memory modules (DIMMs), which are composed of multiple DRAM chips put together to obtain a wide data interface. Each DRAM chip is organized as multiple independent memory banks. Each bank is a two-dimensional array organized as rows×columns. The rows×columns can be used to access a memory location of the DRAM chip. Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. The instructions in the memory 110 can be a part of a suitable operating system (OS) 111. The operating system 111 essentially controls the execution of other computer programs and provides scheduling, input-output control, file and data management, memory management, and communication control and related services.

The cache 170 is a hardware device that stores data and is used by the processor 105 to reduce an average cost (time or energy) to access data from memory 110. The cache 170 is a smaller, faster memory that is located closer to one or more processor cores of the processor 105, which stores copies of the data from frequently used main memory locations.

The memory controller (MC) 115 is a hardware device for managing data traffic to and from memory 110. For example, the MC 115 can manage read and write operations to, for example, one or more DRAM components associated with the memory 110. Computer 101 can include a plurality of MCs 115 with each MC servicing requests from a subset of processor cores of processor 105. In a system with a plurality of MCs 115, whenever an MC 115 desires to communicate with other MCs 115, the MC 115 can send a message(s) to the other MCs using a communication means, for example, a broadcast channel. Accordingly, other MCs 115 can receive the message(s). Based on the content of the message(s), the other MCs can take appropriate action. As such, operation among the plurality of MCs can be coordinated and a decision reached for performing one or more actions for operation of the computer 101.

In an exemplary embodiment of the invention, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment of the invention, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment of the invention, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or another similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals. Other networks include body area networks (BAN) where the electric field of a human body can be used to transmit signals.

If the computer 101 is a PC, workstation, intelligent device or the like, the instructions in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to generally control operations of the computer 101 pursuant to computer instructions that the processor 105 fetches from memory 110 and executes. The processor 105 is further configured to communicate data to and from the memory 110 using the memory controller 115. Examples of instructions that can be fetched and executed by the computer 101 can include ADD, COMPARE, IN, JUMP, JUMP IF, LOAD, OUT and STORE. A group of instructions can form an instruction set architecture (ISA) for computer 101.

The processor 105 can access data from memory 110 using a variety of addressing modes, for example, absolute addressing and indirect addressing. In absolute addressing, the processor 105 obtains data from a particular location in memory 110 by providing an address referring to the location in memory 110. In indirect addressing, instead of providing the address of the location in which data is stored in memory 110, the processor 105 obtains the data by referring to a pointer that is stored in a register, and the pointer points to the location in which the desired data resides in the memory 110.

Figure 2:
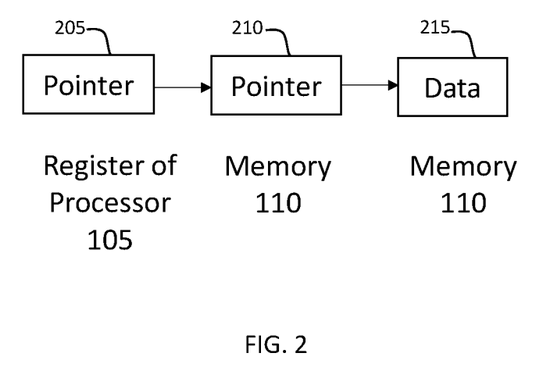
FIG. 2 is a block diagram illustrating one example of a portion of the processing system described in FIG. 1 for practice of the teachings herein.

In an exemplary embodiment of the present invention, as shown in FIG. 2, the computer 101 (shown in FIG. 1) retrieves data through a new program instruction, (Load Indirect), which causes an interaction between the processor 105 and memory 110 in order to obtain the requested data. As illustrated, the Load Indirect instruction can cause processor 105 to fetch data from a memory location 215 in memory 110 by referencing a first pointer stored in register 205 that points to a second pointer stored in a memory location 210 of memory 110 that indicates the location of the desired data in memory 110. The MC 115 can fetch the data using the second pointer.

The Load Indirect is a new instruction in the ISA. The Load Indirect instruction can load registers that are located inside the processor 105 with requested data. The new Load Indirect instruction can allow the MC 115 to retrieve data from memory 110 without needlessly storing pointer information with data thereby reducing the likelihood of polluting cache 170. The Load Indirect instruction can have a plurality of variations.

Figure 3:
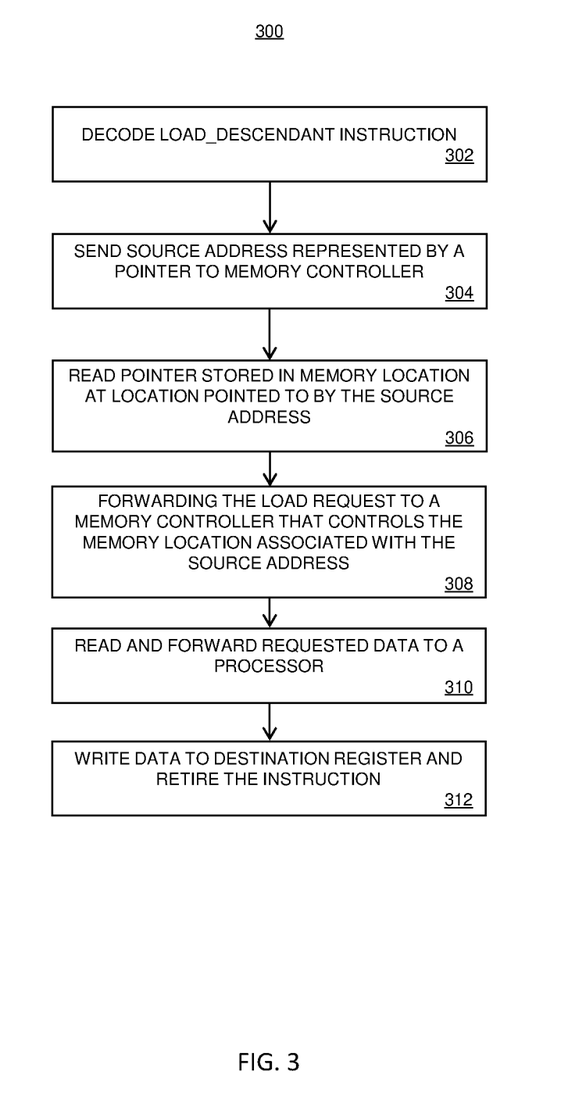
FIG. 3 is a flow diagram illustrating a method for servicing indirect storage requests according to one or more embodiments of the present invention.

FIG. 3 is a flow diagram illustrating a method 300 of servicing indirect storage requests according to one or more embodiments of the present invention. At block 302, the processor 105 decodes a Load Indirect instruction. For example, an instruction syntax can be the following: Load-Descendant src, dest. The src is a register containing an address to a pointer to the data requested. The dest is a register in which the requested data will be written. At block 304, the processor 105 sends the src address to the MC 115 along with an indirect flag set. The indirect flag can be used to indicate whether a command is indirect, which often requires additional processing, or is not indirect (e.g., a read/load command), which is completed as soon as data is returned. At block 306, the MC 115 reads pointer information pointed to by the src address. At block 308, the MC 115 can use the pointer information to forward the storage request to an MC 115 responsible for managing read and write operations for a memory location associated with the src address. At block 310, the responsible MC 115 reads the storage request and forwards the data to the processor 105 through cache 170 in a manner common to a read operation. At block 312, the processor 105 writes the requested data to the address indicated in the dest register and retires the Load Indirect instruction.

Figure 4:
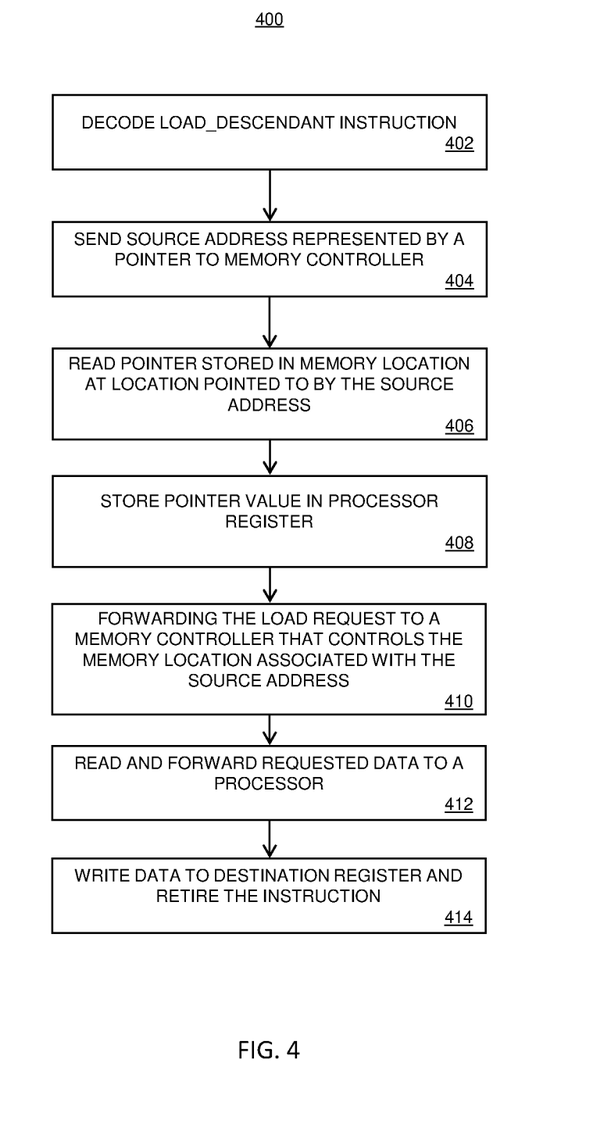
FIG. 4 is a flow diagram illustrating a method for servicing indirect storage requests according to one or more embodiments of the present invention.

FIG. 4 is a flow diagram illustrating a method 400 of servicing indirect storage requests according to one or more embodiments of the present invention. At block 402, the processor 105 decodes a Load Indirect instruction. For example, an instruction syntax can be the following: Load-Descendant src, destPtr, dest. The src can be a register containing an address to a pointer to the data requested. The destPtr can be a register in which a pointer is written. The dest can be a register in which the requested data can be written. At block 404, the processor 105 sends the src address to the MC 115 along with an indirect flag set. At block 406, the MC 115 reads pointer information pointed to by the src address. At block 408, the MC 115 sends a pointer value back to the processor 105 through the cache 170, which can be stored in the destPtr register. At block 410, the MC 115 can use the pointer information to forward the storage request to an MC 115 responsible for managing read and write operations for a memory location associated with the destPtr address. At block 412, the responsible MC 115 reads the storage request and forwards the data to the processor 105 through cache 170 in a manner common to a read operation. At block 414, the processor 105 writes the requested data to the address indicated in the dest register and retires the Load Indirect instruction. By using destPtr, the read of the requested data can occur without waiting for the processor 105 to receive a second address and then request a read at a location associated with the second address.

Figure 5:
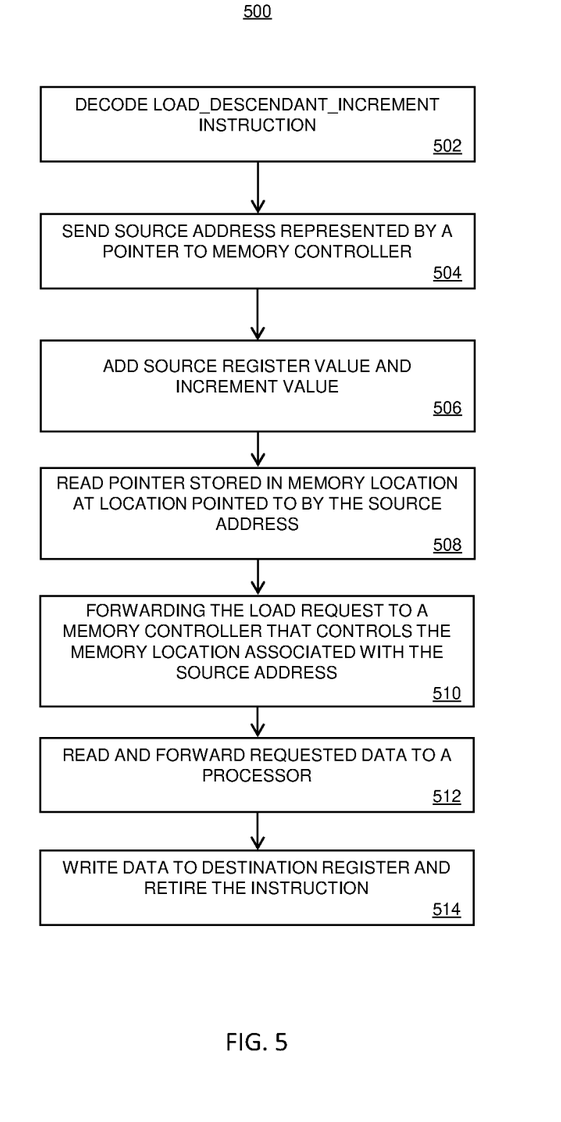
FIG. 5 is a flow diagram illustrating a method for servicing indirect storage requests according to one or more embodiments of the present invention.

FIG. 5 is a flow diagram illustrating a method 500 of servicing indirect storage requests according to one or more embodiments of the present invention. At block 502, the processor 105 decodes a Load Indirect instruction. For example, an instruction syntax can be the following: Load-DescendantIncrement src, dest, #INCR. The src can be a register containing an address to a pointer to the data requested. The dest can be a register in which the requested data can be written. The #INCR can be an immediate value to be added to the pointer in src to obtain a next pointer in order to conduct a subsequent fetch. At block 504, the processor 105 sends the src address to the MC115 along with an indirect flag set. At block 506, the value of #INCR is added to the value stored in the src register and the summation is stored in the src register. At block 508, the MC 115 reads pointer information pointed to by the src address. At block 510, the MC 115 can use the pointer information to forward the storage request to an MC 115 responsible for managing read and write operations for a memory location associated with the src address. At block 512, the responsible MC 115 reads the storage request and forwards the data to the processor 105 through cache 170 in a manner common to a read operation. At block 514, the processor 105 writes the requested data to the address indicated in the dest register and retires the Load Indirect instruction. By using #INCR, the processor 105 can traverse an array of pointers stored in memory 110 without loading the pointers into cache 170.

Figure 6:
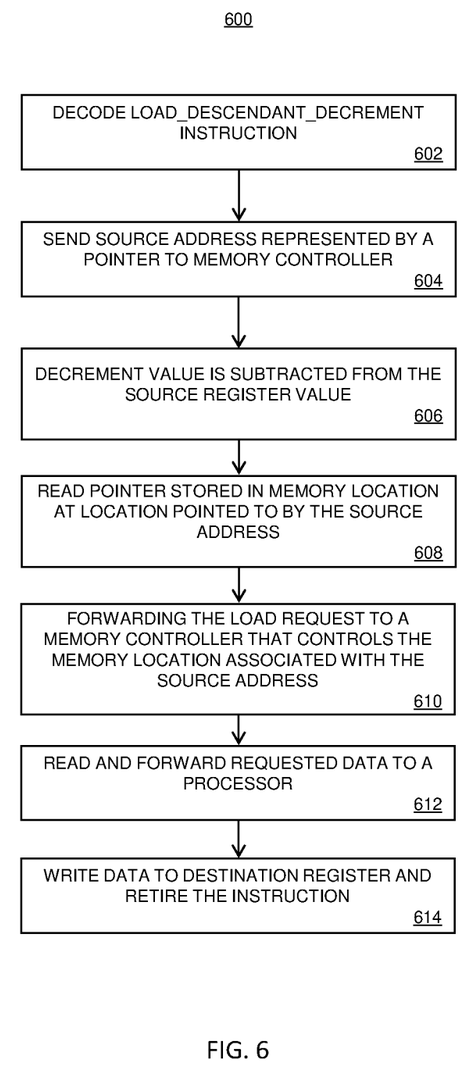
FIG. 6 is a flow diagram illustrating a method for servicing indirect storage requests according to one or more embodiments of the present invention.

FIG. 6 is a flow diagram illustrating a method 600 of servicing indirect storage requests according to one or more embodiments of the present invention. At block 602, the processor 105 decodes a Load Indirect instruction. For example, an instruction syntax can be the following: Load-DescendantDecrement src, dest, #DECR. The src can be a register containing an address to a pointer to the data requested. The dest can be a register in which the requested data can be written. The #DECR can be an immediate value to be subtracted from the pointer in src to obtain a next pointer in order to conduct a subsequent fetch. At block 604, the processor 105 sends the src address to the MC115 along with an indirect flag set. At block 606, the value of #DECR is subtracted from the value stored in the src register with the net result being stored in the src register. At block 608, the MC 115 reads pointer information pointed to by the src address. At block 610, the MC 115 can use the pointer information to forward the storage request to an MC 115 responsible for managing read and write operations for a memory location associated with the src address. At block 612, the responsible MC 115 reads the storage request and forwards the data to the processor 105 through cache 170 in a manner common to a read operation. At block 614, the processor 105 writes the requested data to the address indicated in the dest register and retires the Load Indirect instruction. By using #DECR, the processor 105 can traverse an array of pointers stored in memory 110 without loading the pointers into cache 170.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method for servicing indirect storage requests, the method comprising:
   decoding, by a processor, a storage request instruction;
   sending, by the processor, an address represented by a first pointer to a first memory controller of a plurality of memory controllers that are different from the processor, the address associated with a portion of the storage request instruction;

reading, by the first memory controller, information associated with a second pointer contained at the address associated with the portion of the storage request instruction represented by the first pointer;

forwarding, by the first memory controller, the storage request instruction to a second memory controller of the plurality of memory controllers, wherein the second memory controller is associated with a memory location represented by the second pointer;

reading and forwarding, by the second memory controller, data associated with the storage request instruction to the processor using the second pointer; and writing, by the processor, the forwarded data in a destination register of the processor, wherein the storage request instruction is a load instruction comprising a source operand and destination operand, and wherein the processor sends an indirect flag along with the address represented by the first pointer to the first memory controller, the indirect flag set to indicate whether the load instruction is one of an indirect command or a direct command.

2. The computer-implemented method of claim 1 further comprising retiring the storage request instruction.

3. The computer-implemented method of claim 1 further comprising adding a value to a pointer value associated with the source operand.

4. The computer-implemented method of claim 1 further comprising subtracting a value from a pointer value associated with the source operand.

5. The computer-implemented method of claim 1 further comprising sending a pointer value from the first memory controller to the processor using a cache.

6. The computer-implemented method of claim 5, wherein the pointer value is stored in a register.

7. The computer-implemented method of claim 1, wherein an indirect storage request fetches the data without loading the first and second pointers in a cache.

8. A computer program product for servicing indirect storage requests, the computer program product comprising:
 a non-transitory computer readable storage medium having stored thereon first program instructions executable by a processor to cause the processor to:
  decode a storage request instruction;
  send an address represented by a first pointer to a first memory controller of a plurality of memory controllers that are different from the processor, the address associated with a portion of the storage request instruction;
  command the first memory controller to read information associated with a second pointer contained at the address associated with the portion of the storage request instruction represented by the first pointer;
  command the first memory controller to forward the storage request instruction to a second memory controller of the plurality of memory controllers, wherein the second memory controller is associated with a memory location represented by the second pointer;
  command the second memory controller to read and forward data associated with the storage request instruction to the processor using the second pointer; and
  write the forwarded data in a destination register of the processor, wherein the storage request instruction is a load instruction comprising a source operand and destination operand, and wherein the processor sends an indirect flag along with the address represented by the first pointer to the first memory controller, the indirect flag set to indicate whether the load instruction is one of an indirect command or a direct command.

9. The computer program product of claim 8, wherein the processor is further operable to retire the storage request instruction.

10. The computer program product of claim 8, wherein the processor is further operable to add a value to a pointer value associated with the source operand.

11. The computer program product of claim 8, wherein the processor is further operable to subtract a value from a pointer value associated with the source operand.

12. The computer program product of claim 8, wherein the processor is further operable to send a pointer value from the first memory controller to the processor using a cache.

13. The computer program product of claim 12, wherein the pointer value is stored in a register.

14. The computer program product of claim 8, wherein an indirect storage request fetches the data without loading the first and second pointers in a cache.

15. A system for servicing indirect storage requests, the system comprising:
 a processor;
 first and second memory controllers that are different from the processor; and
 a non-transitory computer readable storage medium coupled to the processor, wherein the processor is configured to:
  decode a storage request instruction; and
  send an address represented by a first pointer to the first memory controller, the address associated with a portion of the storage request instruction;
 wherein the system is configured to:
  read, by the first memory controller, information associated with a second pointer contained at the address associated with the portion of the storage request instruction represented by the first pointer;
  forward, by the first memory controller, the storage request instruction to the second memory controller, wherein the second memory controller is associated with a memory location represented by the second pointer;
  read and forward, by the second memory controller, data associated with the storage request instruction to the processor using the second pointer; and
  write, by the processor, the forwarded data in a destination register of the processor, wherein the storage request instruction is a load instruction comprising a source operand and destination operand, and wherein the processor sends an indirect flag along with the address represented by the first pointer to the first memory controller, the indirect flag set to indicate whether the load instruction is one of an indirect command or a direct command.

16. The system of claim 15, wherein an indirect storage request fetches the data without loading the first and second pointers in a cache.

* * * * *